United States Patent [19]

Rasouli et al.

[11] Patent Number: 5,332,496
[45] Date of Patent: Jul. 26, 1994

[54] SYSTEM FOR PERFORMING CATALYTIC DEHALOGENATION OF AQUEOUS AND/OR NON-AQUEOUS STREAMS

[75] Inventors: Firooz Rasouli, Northbrook; Edwin K. Krug, Wheeling, both of Ill.

[73] Assignee: ElectroCom Gard, Ltd., Niles, Ill.

[21] Appl. No.: 44,730

[22] Filed: Apr. 12, 1993

[51] Int. Cl.⁵ .......................... C02F 1/461; C02F 1/70
[52] U.S. Cl. .................................... 210/180; 210/188;
210/218; 204/278; 204/284; 204/292; 204/294;
204/302; 55/233; 95/210; 422/186.04
[58] Field of Search ............. 423/245.1, 245.3, 240 R,
423/481; 204/278, 284, 290 R, 292, 294, 130,
131, 140, 302; 55/233; 95/210; 210/748, 757,
908, 909, 180, 188, 205, 218; 422/186, 186.04

[56] References Cited

U.S. PATENT DOCUMENTS

| | | | |
|---|---|---|---|
| 3,826,816 | 7/1974 | McCormick | 423/481 |
| 3,892,818 | 7/1975 | Scharfe et al. | 423/481 |
| 3,975,271 | 8/1976 | Saunier et al. | . |
| 4,348,268 | 9/1982 | Müller | 204/294 |
| 4,382,865 | 5/1983 | Sweeney | 210/757 |
| 4,618,686 | 10/1986 | Boyer | . |
| 4,982,024 | 1/1991 | Lin et al. | 423/481 |
| 4,990,260 | 2/1991 | Pisani | . |
| 4,990,317 | 2/1991 | Mak et al. | 423/240 R |
| 5,015,457 | 5/1991 | Langhoff et al. | 423/481 |
| 5,039,423 | 8/1991 | Kelley | . |
| 5,051,030 | 9/1991 | Saha et al. | 210/757 |
| 5,064,526 | 11/1991 | Rogers et al. | . |
| 5,078,889 | 1/1992 | Higgins et al. | . |
| 5,176,897 | 1/1993 | Lester | 423/240 S |

Primary Examiner—Neil McCarthy
Attorney, Agent, or Firm—Hill, Steadman & Simpson

[57] ABSTRACT

A system for removing contaminants from a solution is provided. A supply tank holds the contaminated solution and a reactor containing a catalyst receives the contaminated solution from the supply tank and further receives hydrogen for reacting with the catalyst and contaminants for removal thereof. The system is applicable to both aqueous and non-aqueous streams contaminated with chlorinated hydrocarbon and the like. Furthermore, the hydrogen for the system may be produced in situ.

9 Claims, 2 Drawing Sheets

TO THE POWER SUPPLY

TO THE POWER SUPPLY

50

52 — TO THE POWER SUPPLY

54 — TO THE POWER SUPPLY

SYSTEM FOR PERFORMING CATALYTIC DEHALOGENATION OF AQUEOUS AND/OR NON-AQUEOUS STREAMS

BACKGROUND OF THE INVENTION

The present invention generally relates to removal of contaminants from a solution. More specifically, the invention relates to removal of chlorinated compounds from aqueous streams, such as groundwater, as well as non-aqueous streams.

Groundwater may typically be significantly contaminated by a wide range of problem pollutants, such as radioisotopes, complex organic molecules and the like. Perhaps the most important class of groundwater pollutants, however, is chlorinated hydrocarbons. Chlorinated hydrocarbons are generally toxic. In addition, chlorinated hydrocarbons may be present in significant levels in groundwater, especially at locations such as military sites and civilian priority sites.

A typical dechlorination reaction in the presence of a noble metal catalyst may be expressed as follows:

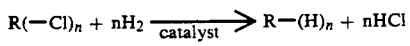

where R identifies an aliphatic or aromatic hydrocarbon radical. Each chlorine atom of the chlorinated compound is replaced by a hydrogen atom which results in a fully hydrogenated aliphatic or aromatic hydrocarbon and hydrogen chloride. Typically, an organic solvent is not affected by the catalytic dechlorination process. However, unsaturated and/or oxygen-containing organic compounds may react with hydrogen to achieve full saturation or removal of oxygen. Therefore, the final product of catalytic dechlorination consists of the original solvent and dechlorinated, now hydrogenated organic compound.

In aqueous systems, due to the volatility of the chlorinated compounds and a low solubility of hydrogen in water, competition between hydrodechlorination and stripping may take place. The reaction may, therefore, be verified by (1) a decrease of the concentration of chlorinated compound in water; (2) a decrease of pH due to HCl formation; and (3) a formation of saturated hydrocarbon gas.

The widespread use of chlorinated hydrocarbons in the past has resulted in a group of contaminants that tend to persist in the environment and that further tend to resist degradation. Halogenated hydrocarbons, such as, for example, TCE, PCE and the like, are the most important of such groundwater pollutants because of their significant presence in particular areas.

A need, therefore, exists for a system for permanently detoxifying aqueous and/or non-aqueous streams contaminated with chlorinated hydrocarbons and the like as well as for simultaneous recovery/treatment of contaminated solvents.

SUMMARY OF THE INVENTION

The present invention provides a system for removing contaminants from a solution having a supply tank for holding the contaminated solution; a reactor for containing a catalyst and for receiving the contaminated solution from the supply tank and further for receiving injected hydrogen; a knockout vessel for receiving reactants from the reactor and for recycling the solution to the reactor with additional solution from the supply tank; and a receiving tank for collecting decontaminated solution from the reactor.

In an embodiment, a treatment unit is further included for cleaning stripped chlorinated hydrocarbon and hydrogenated hydrocarbon from the knockout vessel prior to release to the atmosphere.

In a further embodiment, the contaminated solution within the supply tank is an aqueous stream.

The present invention further provides a system for removing contaminants from a solution having a device for containing the catalyst and electrodes for generating hydrogen in situ to produce first reactants wherein the device further includes a structure including a catalyst; a reactor for oxidizing the first reactants resulting in second reactants; and a scrubber for removing a portion of the second reactants.

In an embodiment, the electrodes and catalysts are separate; the electrodes are parallel plates, and the catalyst is a noble metal supported on alumina or activated carbon pellets.

In another embodiment, the electrode and catalyst are combined, and the structure is an activated carbon structure impregnated with a noble metal catalyst.

In another embodiment, the structure is a pair of parallel sheets of activated carbon impregnated with a noble metal catalyst.

In yet another embodiment, the structure is a porous honeycomb configuration of activated carbon impregnated with a noble metal catalyst.

In a still further embodiment, the structure is a tube of activated carbon impregnated with a noble metal catalyst.

In yet another embodiment, the structure is a rod of activated carbon impregnated with a noble metal catalyst.

The present invention further provides a method for removing contaminants from a solution by providing a chamber having a catalyst wherein the chamber receives the contaminated solution; providing hydrogen to the chamber wherein the hydrogen reacts in the presence of the catalyst with the contaminants; and removing the contaminants from the solution.

In an embodiment, the method of the present invention further provides for heating of the contaminants of the solution for oxidation thereof.

In another embodiment, the method provides a structure for supporting the catalyst in the chamber.

It is, therefore, an advantage of the present invention to provide a system for removing contaminants from a solution.

A further advantage of the present invention is to provide a system for removing contaminants from aqueous streams, such as groundwater, or non-aqueous streams, such as silvex/kerosene, PCB/oil, or the like.

Another advantage of the present invention is to provide a system for destroying chlorinated hydrocarbons found in groundwater.

A still further advantage of the present invention is to provide a system for producing hydrogen electrically (in situ) from the contaminated solution.

A still further advantage of the present invention is to provide a system for reducing concentration of chlorinated hydrocarbons present in an aqueous system to acceptable levels.

Moreover, an advantage of the present invention is to provide a system which is both simple and economical to operate in removing contaminants from aqueous and non-aqueous streams.

Finally, an advantage of the present invention is an efficient innovative design for an integrated electrode/catalyst assembly.

Additional features and advantages of the present invention are described in, and will be apparent from, the detailed description of the presently preferred embodiments and from the drawings.

DETAILED DESCRIPTION OF THE PRESENTLY PREFERRED EMBODIMENT

A system is generally disclosed for destroying chlorinated hydrocarbons and other contaminants found in, for example, aqueous streams, such as groundwater. The process involves contacting hydrogen with an organic compound in the presence of a catalyst at substantially ambient temperatures and pressures for an aqueous stream and moderate temperature and pressure conditions for a non-aqueous stream. The hydrogen for the process may be produced electrically in situ from the contaminated water. The concentration of chlorinated hydrocarbons in the system may, therefore, be reduced to acceptable levels.

Figure 1:
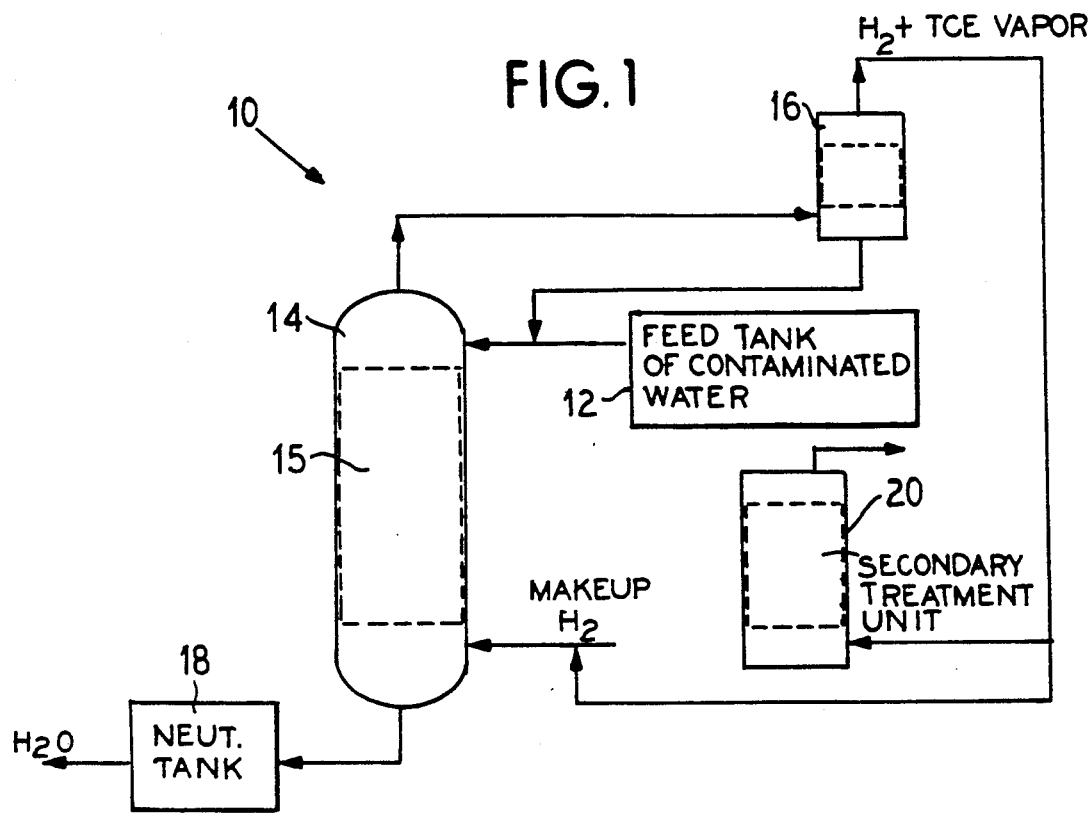
FIG. 1 illustrates a schematic of a process for an aqueous system for an embodiment of the invention.

Referring now to the drawings, FIG. 1 generally illustrates a system 10 for treating aqueous streams contaminated by chlorinated hydrocarbons. The system 10 includes a feed tank 12, a fixed bed countercurrent reactor 14, a hydrogen recycle loop equipped with a water knockout/recycle pot 16 and an acid neutralization tank 18 for the product water.

The feed tank 12 provides groundwater, for example, or other solution containing contaminants to the reactor 14. The contaminated solution is distributed across the reactor 14 such that the solution percolates downward. The reactor 14 includes a catalyst bed 15 including a noble metal catalyst supported on alumina or activated carbon pellets through which the contaminated solution reacts with injected hydrogen ($H_2$). The hydrogen may be fed into the base of the reactor 14 using a standard pressurized hydrogen source such that the contaminants, in the form of halogenated hydrocarbons, in the solution react with the injected hydrogen as it flows through the reactor 14 and the catalyst bed 15. The hydrogen may be injected at a rate calculated to minimize stripping of the chlorinated species within the reactor 14, but further at a rate to maximize conversion thereof. As a result, unreacted hydrogen is collected at the top of the reactor 14 and is circulated to the reactor 14.

A secondary treatment unit 20 may be further included for cleaning vent gas before release to the atmosphere. Solution from a knockout pot 16 may also contain chlorinated hydrocarbons which may be recycled to the reactor 14 and mixed with the contaminated solution from the feed tank 12. Product water or other solution may be collected and removed from the bottom of the reactor 14 as a combination of the original solvent and the dechlorinated and currently hydrogenated organic compound. The system 10 may further be implemented for use with non-aqueous streams by adding a heater and/or a cooler to the system 10.

Figure 2:
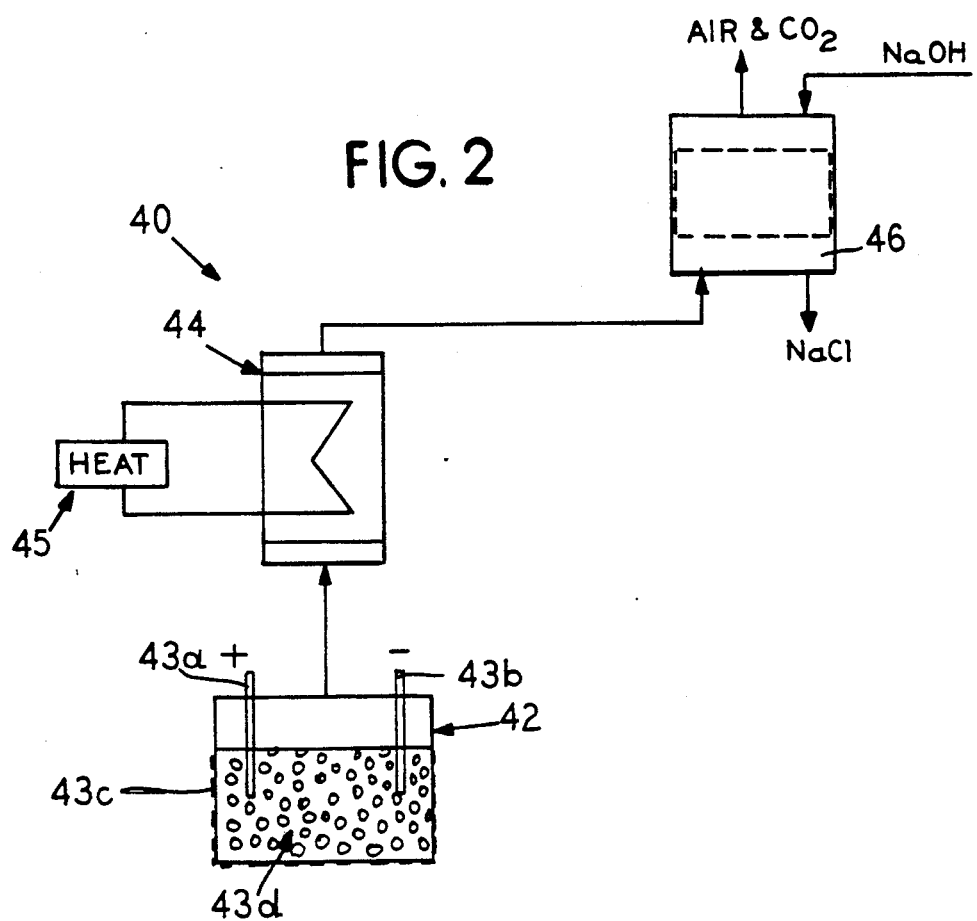
FIG. 2 illustrates a schematic of a in-situ process of an embodiment of the present invention.

An alternative system 40 to that disclosed with reference to FIG. 1 is shown in FIG. 2. The system 40 illustrated in FIG. 2 is only for aqueous solutions and is more suitable for in situ applications. The device 42 consists of an electrolysis device for generating hydrogen from a contaminated solution, such as contaminated groundwater, and a perforated container for holding the catalyst pellets.

The device 42, as illustrated in FIG. 2, includes a pair of electrodes 43$a$, 43$b$, the container 43$c$, and a noble metal catalyst 43$d$, such as platinum, palladium and rhodium on alumina or activated carbon pellets, and the like.

In an alternative approach, the electrodes and the catalyst may be combined by using structures made of porous, conductive materials with high surface area such as activated carbon, and depositing or impregnating the desired noble metal catalyst on the structure. Such structures are shown in FIGS. 3-6. This combination provides an ideal electrocatalyst for removal of the contaminants from the solution in the device 42.

The catalytic hydrogenation of chlorinated hydrocarbons is carried out at room temperature and pressure within the device 42. The hydrogen required for the process can be produced in situ from the contaminated solution by the electrolysis. The resultant products of the reaction in the device 42 are primarily saturated hydrocarbons, unreacted contaminants and hydrochloric acid.

The hydrochloric acid remains in a liquid phase, but the organic materials along with oxygen, the remaining hydrogen and water may transfer to a vapor phase. The resultant stream is directed to an oxidation reactor 44 where the organic compounds are oxidized at 570° F. by a heat source 45. The reaction products which leave the oxidation reactor 44 are carbon dioxide, hydrochloric acid and free chlorine. Some of the chlorinated hydrocarbons contain enough hydrogen to react with the chlorine gas. If, however, the hydrogen-to-carbon ratio drops below three, the reaction produces a significant amount of chlorine. From the presence of hydrogen and water vapor in the feed stream, all of the chlorine molecules are hydrolyzed to hydrochloric acid. Subsequently, a scrubber 46 in the system 40 (using dilute caustic solution) removes all or a substantial portion of the remaining hydrochloric acid from the gas stream. The air leaving the scrubber 46 contains only carbon dioxide ($CO_2$) which, therefore, may be directly released into the atmosphere.

As a result of the foregoing, the process permanently detoxifies water contaminated with chlorinated hydrocarbons and may also, therefore, provide simultaneous recovery/treatment of contaminated solvents.

Figure 3:
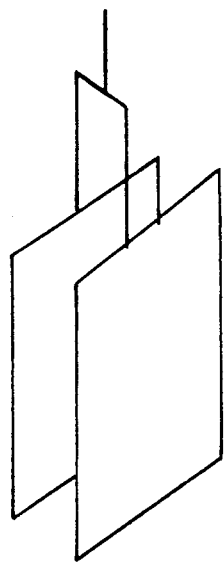
FIG. 3 illustrates an embodiment of the electrocatalyst device for the system shown in FIG. 2.
Figure 4:
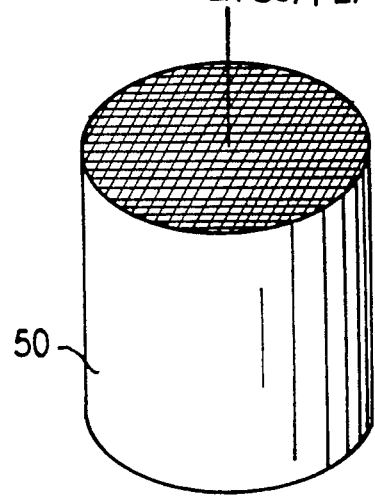
FIG. 4 illustrates an alternate embodiment of the electrocatalyst device for the system shown in FIG. 2.
Figure 5:
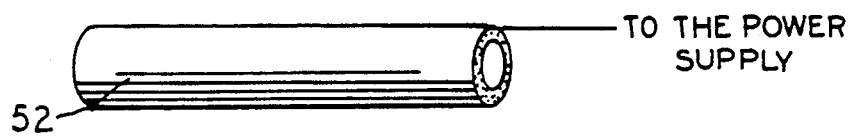
FIG. 5 illustrates another alternate embodiment of the electrocatalyst device for the system shown in FIG. 2.
Figure 6:
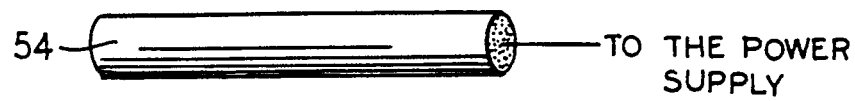
FIG. 6 illustrates yet another alternate embodiment of the electrocatalyst device for the system shown in FIG. 2.

Other contemplated configurations for the support materials including the noble metal electrocatalyst are shown in FIGS. 4-6. FIG. 3 illustrates the parallel plates 43$a$ and 43$b$ as shown and described in the corresponding description of FIG. 2 within the device 42.

FIG. 4 illustrates a support in a honeycomb configuration 50 which provides the highest surface area per unit volume of the configurations illustrated in FIGS. 3-6. Every site on the honeycomb configuration 50 acts as an electrocatalyst and, therefore, becomes a hydrogen generation source. As a result, a CHC molecule which is adsorbed on the surface, or in the liquid, will have a greater chance of reacting with the hydrogen on the catalyst surface of the honeycomb configuration 50. Therefore, the greater the surface area of the configuration of the electrocatalyst, the greater the opportunity for reacting with the hydrogen.

FIG. 5 illustrates an electrocatalyst support structure in the form of a tube 52. FIG. 6 illustrates another embodiment of the electrocatalyst support structure in the form of a rod 54. Each support structure, the tube 52 and the rod 54, provide a surface including the noble metal catalyst for the hydrogen to react.

The hydrodehalogenation reaction, in the presence of a catalyst involves diffusion of the contaminant molecules and the hydrogen atoms through the bulk fluid to the surface of the catalyst on the support structure. Adsorption and reaction of the reactants on the catalyst then takes place. Then, desorption of the products takes place. The diffusion of the contaminant molecules and the hydrogen atoms though the bulk fluid to the surface of the catalyst is rate-limiting in the sense that it consumes a major portion of the chemical potential available for carrying out the process. Therefore, the configuration of the support materials, such as the configurations of the support structures illustrated in FIGS. 3-6, may be critical.

By way of example, but not limitation, contemplated examples of the present invention will now be given.

EXAMPLE 1

Water solutions containing trichloroethylene and tetrachloroethylene (TCEs) were tested in concentrations ranging from 50 mg/l up to their solubility limits. The results of the tests performed using the systems of the present invention were recorded. The results indicated that approximately 95% of the TCEs were removed from the feed solution for an aqueous system. Furthermore, approximately 43% of the feed TCEs were removed by stripping.

EXAMPLE 2

Tests were further conducted in a non-aqueous system with a mixture of 9.4% silvex in kerosene at 50 psig at temperatures between 500° to 600° F. The result of the tests showed a consistent dechlorination of about 80% in a single pass through the system and greater than 99% in two passes through the system.

EXAMPLE 3

Under the same conditions of Example 2, the dechlorination of PCB's (arochlors) was also conducted using the system of the present invention. The degree of chlorination for these compounds was concentration dependent, but the system achieved 93% dechlorination of a starting solution containing 2,000 ppm of PCB.

EXAMPLE 4

Tests were further conducted for treating the gas stream leaving the catalytic dehalogenation system before releasing the same to the atmosphere. The gas stream was further treated catalytically prior to release. Tests were conducted with vapors evolving from an aerated TCE/water system using a noble metal catalyst at 570° F. The conversion efficiency of the process for TCE was approximately 99%.

The system, therefore, provides a process for catalytically dechlorinating non-aqueous systems by removal of chlorinated hydrocarbons under moderate temperature conditions and moderate pressure conditions. In addition, for aqueous systems, the process of the system for removing hydrocarbons proceeded at substantially ambient pressures and ambient temperatures.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changed and modification be covered by the appended claims.

We claim as our invention:

1. A system for removing contaminants from a solution comprising:
   a device having a noble metal catalyst therein, the device further having a contaminated solution therein and further having hydrogen and electrodes for generating the hydrogen in situ from said contaminated solution to produce first vapor phase reactants;
   a reactor constructed and arranged to receive the first vapor phase reactants wherein the reactor oxidizes the first vapor phase reactants resulting in second vapor phase reactants; and
   a scrubber constructed and arranged to receive the second vapor phase reactants wherein the scrubber removes a portion of the second reactants.

2. The system of claim 1 wherein the catalyst and the electrodes are integrally formed forming a structure within the device.

3. The system of claim 1 further comprising:
   a heating means constructed and arranged for providing heat to the reactor thereby assisting oxidation of the first reactants in the reactor.

4. The system of claim 1 wherein the catalyst is a noble metal supported on a support material comprising a material selected from the group consisting of activated carbon and alumina forming a structure wherein the structure is contained within the device.

5. The system of claim 2 wherein the structure is activated carbon impregnated with a noble metal catalyst.

6. The system of claim 2 wherein the structure is a pair of parallel sheets of activated carbon impregnated with a noble metal catalyst.

7. The system of claim 2 wherein the structure is a porous honeycomb configuration of activated carbon impregnated with a noble metal catalyst.

8. The system of claim 2 wherein the structure is a tube of activated carbon impregnated with a noble metal catalyst.

9. The system of claim 2 wherein the structure is a rod of activated carbon impregnated with a noble metal catalyst.

* * * * *